(12) United States Patent
Kosaka et al.

(10) Patent No.: US 11,569,502 B2
(45) Date of Patent: Jan. 31, 2023

(54) CATHODE MIXTURE FOR ALL SOLID-STATE BATTERY, CATHODE FOR ALL SOLID-STATE BATTERY, ALL SOLID-STATE BATTERY, AND METHOD FOR PRODUCING THE SAME

(71) Applicant: TOYOTA JIDOSHA KABUSHIKI KAISHA, Toyota (JP)

(72) Inventors: Daichi Kosaka, Susono (JP); Jun Yoshida, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 171 days.

(21) Appl. No.: 16/195,279

(22) Filed: Nov. 19, 2018

(65) Prior Publication Data
US 2019/0221843 A1 Jul. 18, 2019

(30) Foreign Application Priority Data

Jan. 17, 2018 (JP) .............................. JP2018-005891

(51) Int. Cl.
*H01M 4/505* (2010.01)
*H01M 10/0585* (2010.01)
(Continued)

(52) U.S. Cl.
CPC ......... *H01M 4/505* (2013.01); *H01M 4/0402* (2013.01); *H01M 4/0404* (2013.01);
(Continued)

(58) Field of Classification Search
None
See application file for complete search history.

(56) References Cited

U.S. PATENT DOCUMENTS

2006/0105239 A1  5/2006  Paulsen et al.
2007/0122705 A1* 5/2007  Paulsen .............. C01G 45/1228
                                                        429/231.3
(Continued)

FOREIGN PATENT DOCUMENTS

CN          1708867 A    12/2005
CN        104022280 A     9/2014
(Continued)

OTHER PUBLICATIONS

Lee, Ki-Soo et al. "Synthesis and electrochemical performances of core-shell structured Li[(Ni1/3Co1/3Mn1/3)0.8(Ni1/2Mn1/2)0.2]O2 cathode material for lithium ion batteries". Journal of Power Sources, vol. 195, No. 18, 2010, pp. 6043-6048. Elsevier BV, doi: 10.1016/j.jpowsour.2010.02.002. (Year: 2010).*
(Continued)

*Primary Examiner* — Robert S Carrico
(74) *Attorney, Agent, or Firm* — Oliff PLC

(57) ABSTRACT

When a layered rock-salt type cathode active material and a sulfide solid electrolyte are mixed to be a cathode mixture, and an all solid-state battery is obtained using this mixture, oxygen is released from the cathode active material when the battery is charged, and the sulfide solid electrolyte is oxidized, increasing the battery internal resistance. To increase the concentration of cobalt inside the active material, and at the same time to lower the concentration of cobalt of the surface of the cathode active material, to suppress oxygen release in charging, specifically, a cathode mixture includes: a cathode active material; and a sulfide solid electrolyte, wherein the cathode active material has a layered rock-salt crystal phase, and is made of a composite oxide containing Li, Ni, Co, and Mn, and the concentration of cobalt inside the cathode active material is higher than that of a surface of the cathode active material.

19 Claims, 9 Drawing Sheets

Two dimensional image of cathode active material

(51) Int. Cl.
  H01M 4/36     (2006.01)
  H01M 10/0562  (2010.01)
  H01M 4/62     (2006.01)
  H01M 4/1391   (2010.01)
  H01M 4/04     (2006.01)
  H01M 4/525    (2010.01)
  H01M 10/052   (2010.01)
  H01M 10/42    (2006.01)
  H01M 4/02     (2006.01)

(52) U.S. Cl.
  CPC ......... *H01M 4/1391* (2013.01); *H01M 4/366* (2013.01); *H01M 4/525* (2013.01); *H01M 4/62* (2013.01); *H01M 10/052* (2013.01); *H01M 10/0562* (2013.01); *H01M 10/0585* (2013.01); *H01M 10/4235* (2013.01); *H01M 2004/028* (2013.01); *H01M 2300/0068* (2013.01)

(56) References Cited

U.S. PATENT DOCUMENTS

| | | | |
|---|---|---|---|
| 2009/0202905 A1 | 8/2009 | Morita et al. | |
| 2014/0065483 A1* | 3/2014 | Park | H01M 4/366 |
| | | | 429/223 |
| 2014/0272590 A1* | 9/2014 | Zhang | H01M 4/1391 |
| | | | 429/223 |
| 2015/0096169 A1* | 4/2015 | Hasegawa | H01M 4/13 |
| | | | 29/623.5 |
| 2016/0013486 A1* | 1/2016 | Hirai | H01M 4/525 |
| | | | 429/223 |
| 2016/0211519 A1 | 7/2016 | Uchiyama et al. | |
| 2016/0315324 A1 | 10/2016 | Miki et al. | |
| 2017/0155127 A1 | 6/2017 | Shindo et al. | |
| 2018/0316008 A1* | 11/2018 | Arimura | H01M 4/5825 |

FOREIGN PATENT DOCUMENTS

| | | |
|---|---|---|
| CN | 106099050 A | 11/2016 |
| CN | 106784798 A | 5/2017 |
| JP | 2004-348981 A | 12/2004 |
| JP | 2009-193780 A | 8/2009 |
| JP | 2010-073539 A | 4/2010 |
| JP | 2014-040363 A | 3/2014 |
| JP | 2015-056307 A | 3/2015 |
| JP | 2017-103065 A | 6/2017 |
| WO | 2017/013520 A1 | 1/2017 |

OTHER PUBLICATIONS

Hou, Peiyu et al. "Design, preparation and properties of core-shelled Li{[Ni$_y$Co$_{1-2y}$Mn$_y$](1-x)}core{[Ni$_{1/2}$Mn$_{1/2}$]x}shellO2 (0≤x≤0.3, 6y+3x-6xy=2) as high-performance cathode for Li-ion battery". Electrochimica Acta, vol. 133, 2014, pp. 589-596. Elsevier BV, doi: 10.1016/j.electacta.2014.04.066. (Year: 2014).*

* cited by examiner

Two dimensional image of cathode active material

CATHODE MIXTURE FOR ALL SOLID-STATE BATTERY, CATHODE FOR ALL SOLID-STATE BATTERY, ALL SOLID-STATE BATTERY, AND METHOD FOR PRODUCING THE SAME

FIELD

The present application discloses, for example, a cathode mixture used for an all solid-state battery.

BACKGROUND

Patent Literatures 1 to 3 disclose cathode active materials formed of lithium-containing composite oxides. Such a cathode active material formed of a lithium-containing composite oxide can be used in a cathode for an all solid-state battery as well. A composite oxide having a layered rock-salt crystal phase and containing Li, Ni, Co and Mn is a known example of a cathode active material usable for an all solid-state battery.

CITATION LIST

Patent Literature

Patent Literature 1: JP 2014-040363 A
Patent Literature 2: JP 2015-056307 A
Patent Literature 3: JP 2017-103065 A

SUMMARY

Technical Problem

A cathode mixture containing a sulfide solid electrolyte and a cathode active material that is formed of a composite oxide as described above is used in a cathode for an all solid-state battery. Here, according to the new findings of the inventors of the present application, using a cathode mixture containing a sulfide solid electrolyte and a cathode active material that is formed of a composite oxide in an all solid-state battery leads to release of oxygen from the cathode active material when the all solid-state battery is charged, which results in oxidation of the sulfide solid electrolyte. That is, internal resistance in an all solid-state battery using a cathode active material formed of a composite oxide as described above is easy to increase due to oxidation of a sulfide solid electrolyte, which is problematic.

Solution to Problem

The present application discloses, as one means for solving the problem, a cathode mixture for an all-solid-state battery, the cathode mixture comprising: a cathode active material; and a sulfide solid electrolyte, wherein the cathode active material consists of a composite oxide containing Li, Ni, Co, and Mn, the cathode active material has a layered rock-salt crystal phase, and a concentration of cobalt inside the cathode active material is higher than a concentration of cobalt of a surface of the cathode active material.

In the present application, a portion of the cathode active material excluding "a surface of the cathode active material" and "the vicinity of the surface of the cathode active material" may be referred to as "inside the cathode active material".

"The vicinity of the surface of the cathode active material" may satisfy at least one of the following (1) and (2): (1) as shown in FIG. 1, when the cathode active material is observed with a scanning electron microscope, a transmission electron microscope, or the like to obtain a two dimensional image thereof, a region X when $a_1/(a_1+a_2)$ is no more than 0.1 is referred to as "the vicinity of the surface of the cathode active material", where an area of the region X that is defined by the surface of the cathode active material and a predetermined depth from the surface is $a_1$, and an area of the whole of the cathode active material is $a_1+a_2$, on the two dimensional image of the cathode active material; and (2) a portion having a depth of 100 nm from the surface of the cathode active material is referred to as "the vicinity of the surface of the cathode active material".

A deeper portion (inside portion) than "the vicinity of the surface of the cathode active material" defined as described above may be referred to as "inside the cathode active material".

"A concentration of cobalt" means mol % (atm %) of cobalt in all the elements.

"A concentration of cobalt inside the cathode active material" and "a concentration of cobalt of a surface of the cathode active material" can be easily identified by, for example, measuring the concentrations of the elements inside, and of the surface of the cathode active material by means of SEM-EDX or the like.

Preferably, the cathode mixture for an all solid-state battery of the present disclosure further comprises: a coating layer with which the surface of the cathode active material is coated, the coating layer containing Li, and Nb.

The present application discloses, as one means for solving the problem, a cathode for an all solid-state battery, the cathode comprising: the cathode mixture of the present disclosure; and a cathode current collector.

The present application discloses, as one means for solving the problem, an all solid-state battery comprising: the cathode of the present disclosure; an anode; and a solid electrolyte layer.

The present application discloses, as one means for solving the problem, a method for producing a cathode mixture for an all solid-state battery, the method comprising: coating a surface of an inside active material with an outside active material, to obtain a cathode active material; and mixing the cathode active material and a sulfide solid electrolyte, to obtain a cathode mixture, wherein the cathode active material consists of a composite oxide containing Li, Ni, Co, and Mn, the cathode active material has a layered rock-salt crystal phase, and a concentration of cobalt in the inside active material is higher than a concentration of cobalt in the outside active material.

In the method for producing a cathode mixture of the present disclosure, preferably, the inside active material has composition represented by $LiNi_xCo_yMn_zO_{2\pm\delta}$ ($0 \leq x \leq 0.5$, $0 < y \leq 1$, $0 \leq z \leq 0.5$, $0.8 \leq x+y+z \leq 1.2$), and the outside active material has composition represented by $LiNi_\alpha Co_\beta Mn_\gamma O_{2\pm\delta}$ ($0 < \alpha \leq 0.5$, $0 \leq \beta \leq 1$, $0 < \gamma \leq 0.5$, $0.8 \leq \alpha+\beta+\gamma \leq 1.2$, $\beta < y$).

In the method for producing a cathode mixture of the present disclosure, preferably, a rate of increasing a c-axis length of a layered rock-salt crystal phase included in the inside active material in charging is higher than a rate of increasing a c-axis length of a layered rock-salt crystal phase included in the outside active material in charging.

"A rate of increasing a c-axis length of a layered rock-salt crystal phase included in the inside active material in charging" is obtained as follows: that is, (1) a layered rock-salt type composite oxide having the same composition as the inside active material is used as a cathode active material, to make a half cell (such as a coin cell of an electrolyte solution system); (2) as to this half cell, XRD patterns of the cathode active material (diffraction patterns derived from a layered rock-salt crystal phase) are obtained while the SOC (the amount of extracting Li ions from the cathode active material) is changed. It is noted that XRD patterns in the range of 0 mAh/g to 280 mAh/g in charge capacity are obtained; (3) curve fitting (full pattern matching) is done on the obtained XRD patterns, to obtain a c-axis length of the layered rock-salt crystal phase per amount of extracting Li; and (4) (the maximum value of a c-axis length)/(a c-axis length in uncharging) is calculated to identify "a rate of increasing a c-axis length".

As to "a rate of increasing a c-axis length of a layered rock-salt crystal phase included in the outside active material in charging", (1) a layered rock-salt type composite oxide having the same composition as the outside active material is used to make a half cell, and "a rate of increasing a c-axis length" is identified via the same operations as (2) to (4) described above.

In the method for producing a cathode mixture of the present disclosure, preferably, in said coating, the surface of the inside active material is coated with the outside active material, to obtain the cathode active material, and a surface of the cathode active material is further coated with a coating layer containing Li, and Nb.

The present application discloses, as one means for solving the problem, a method for producing a cathode for an all solid-state battery, the method comprising: producing a cathode mixture by the method of the present disclosure; and layering the cathode mixture onto a surface of a cathode current collector.

The present application discloses, as one means for solving the problem, a method for producing an all solid-state battery, the method comprising: producing a cathode by the method of the present disclosure; and layering the cathode, a solid electrolyte layer, and an anode.

Advantageous Effects

According to the new findings of the inventors of the present application, a crystalline structure of a cathode active material consisting of a layered rock-salt type composite oxide containing Li, Ni, Co and Mn becomes unstable when a battery is charged (especially at a high voltage), which makes it easy for the cathode active material to release oxygen. It is believed that the amount of Li ions extracted from the layered rock-salt crystalline structure increases at a high potential, to increase repulsion between oxygen-oxygen that compose the crystalline structure, which is a direct driving force for change in the crystalline structure. In contrast, the amount of extracting Li ions from a cathode active material at a predetermined potential is determined according to the amount of ions (especially cobalt) whose valences have been changed until the predetermined potential is reached. From the above, it seems to be effective to lower the concentration of cobalt in a layered rock-salt type composite oxide for suppressing release of oxygen in charging. However, if the concentration of cobalt in a layered rock-salt type composite oxide is lowered, the capacity as a cathode active material may decrease, and ion conductivity may lower. On the other hand, since oxygen is believed to be released from a cathode active material conspicuously around the interface between the cathode active material and a sulfide solid electrolyte, it is expected that lowering the concentration of cobalt of the surface of a cathode active material makes it possible to effectively suppress release of oxygen in charging as keeping a desired capacity etc.

In the cathode mixture of this disclosure, while the concentration of cobalt inside a layered rock-salt type cathode active material is increased to secure a high capacity, the concentration of cobalt of its surface is lowered, to achieve stabilization of a crystalline structure on the surface, which makes it possible to suppress release of oxygen in charging. That is, if the cathode mixture of this disclosure is used in a cathode of an all solid-state battery, oxidization of a sulfide solid electrolyte accompanying release of oxygen from a cathode active material can be suppressed, and increase of the internal resistance of the all solid-state battery can be suppressed.

BRIEF DESCRIPTION OF DRAWINGS

FIG. 8A corresponds to Example 1, FIG. 8B corresponds to Example 2, FIG. 8C corresponds to Comparative Example 1, FIG. 8D corresponds to Comparative Example 2, and FIG. 8E corresponds to Comparative Example 3; FIG. 9A corresponds to Example 1, FIG. 9B corresponds to Example 2, and FIG. 9C corresponds to Comparative Example 1.

DETAILED DESCRIPTION OF EMBODIMENTS

1. Cathode Mixture 10

Figure 1:
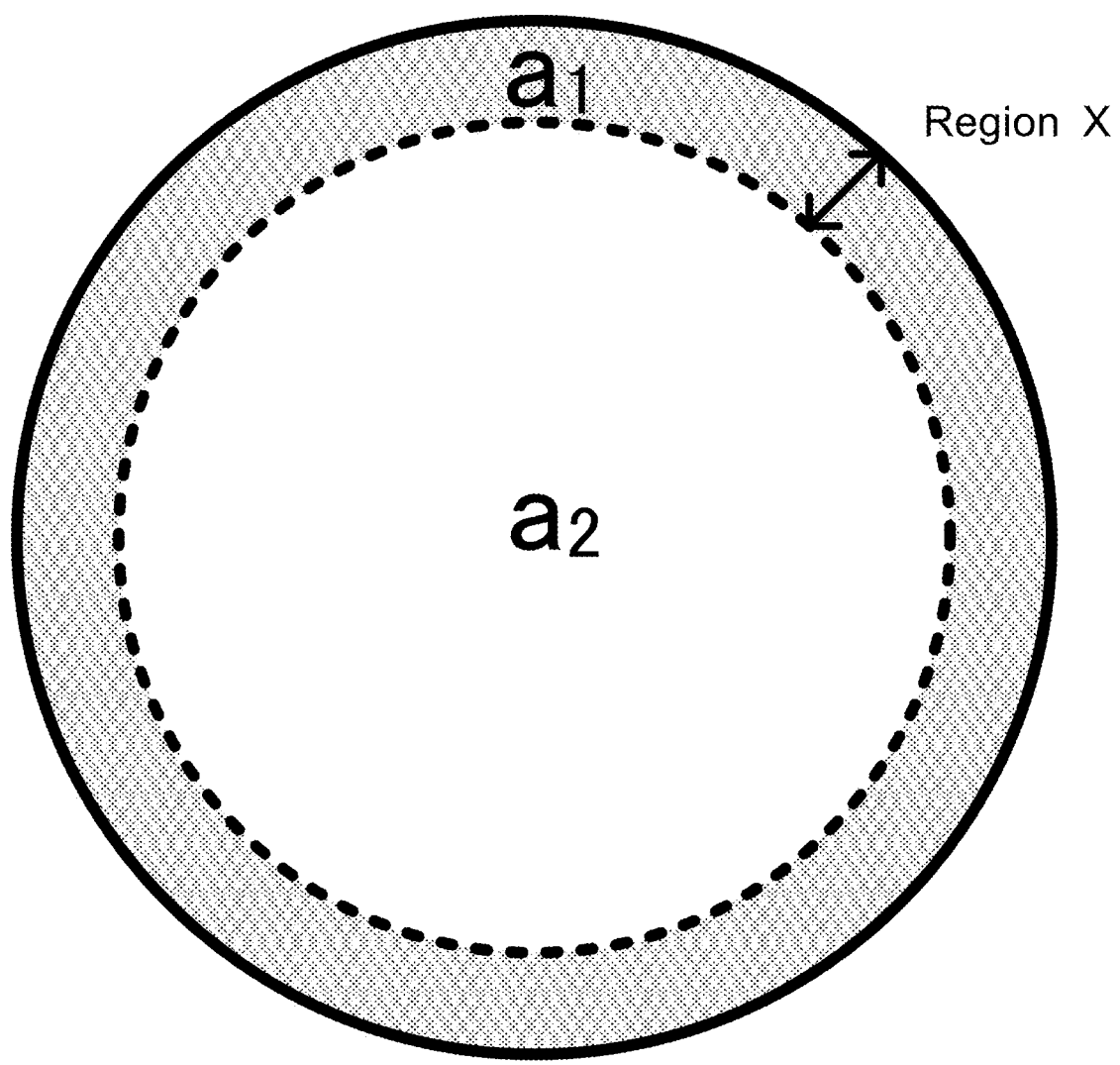
FIG. 1 is an explanatory schematic view of "the vicinity of the surface of the cathode active material" and "inside the cathode active material"
Figure 2:
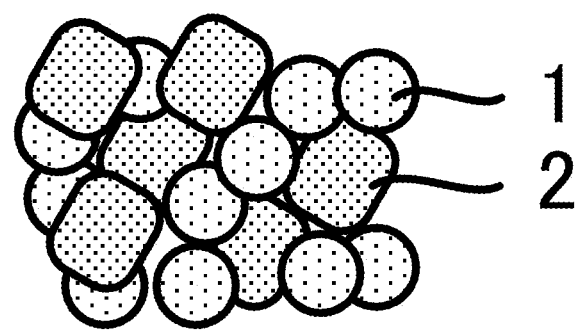
FIG. 2 is an explanatory schematic view of a cathode mixture 10.

A cathode mixture 10 shown in FIG. 2 is a cathode mixture used for an all solid-state battery, and a feature thereof is to include a cathode active material 1; and a sulfide solid electrolyte 2, wherein the cathode active material 1 consists of a composite oxide containing Li, Ni, Co, and Mn, the cathode active material 1 has a layered rock-salt crystal phase, and the concentration of cobalt inside the cathode active material 1 is higher than that of a surface of the cathode active material 1.

1.1. Cathode Active Material 1

The cathode active material 1 consists of a composite oxide containing Li, Ni, Co, and Mn. This composite oxide may contain (an) element(s) other than Li, Ni, Co, Mn and O as far as the problem can be solved. Preferably, the composite oxide consists of Li, Ni, Co, Mn, and O. The cathode active material 1 has a layered rock-salt crystal phase. For example, diffraction peaks derived from a layered rock-salt crystal phase are preferably confirmed at positions where 2θ=18.5±0.5° (plane 003), 37.0±0.5° (plane 101), 38±1° (plane 006 and plane 102), 45±1° (plane 104), 49±1° (plane 105) and 59±1° (plane 107) in X-ray diffraction measurement using CuKα as a source which the cathode active material 1 is subjected to. These diffraction peak positions fluctuate a little according to composition in the cathode active material. The values of 2θ represent the diffraction peak positions in a discharging state (state where Li is not released). The cathode active material 1 may include (a) crystal phase(s) other than a layered rock-salt crystal phase as far as the problem can be solved. Preferably, diffraction peaks only derived from a layered rock-salt crystal phase are confirmed in X-ray diffraction measurement as described above which the cathode active material 1 is subjected to.

It is important that in the cathode mixture 10 of this disclosure, the concentration of cobalt inside the cathode active material 1 is higher than that of the surface of the cathode active material 1. The concentration of cobalt may increase either continuously or intermittently from the surface of the cathode active material 1 toward the inside thereof. Increasing the concentration of cobalt inside the cathode active material 1 makes it possible to secure a high capacity as active material. In contrast, lowering the concentration of cobalt of the surface of the cathode active material 1 makes it possible to suppress release of oxygen in charging.

The composition ratio of Li, Ni, Co, and Mn (and O) in the cathode active material 1 is not specifically limited as long as a layered rock-salt crystal phase is included. As described above, the concentration of cobalt inside the cathode active material 1 is higher than that of its surface. In other words, the surface of the cathode active material 1 has composition different from its inside. Co does not have to exist on the surface of the cathode active material 1. Neither Ni nor Mn has to exist inside the cathode active material 1.

For example, the inside of the cathode active material 1 preferably has composition represented by $LiNi_xCo_yMn_zO_{2\pm\delta}$ ($0 \leq x \leq 0.5$, $0 < y \leq 1$, $0 \leq z \leq 0.5$, $0.8 \leq x+y+z \leq 1.2$). When the inside of the cathode active material 1 has such composition, a layered rock-salt type composite oxide is easy to be obtained while the concentration of cobalt is increased. The lower limit of x is more preferably no less than 0.25, and the upper limit thereof is more preferably no more than 0.40. The lower limit of y is more preferably no less than 0.25, and the upper limit thereof is more preferably no more than 0.40. The lower limit of z is more preferably no less than 0.25, and the upper limit thereof is more preferably no more than 0.40. Especially preferably, all of x, y, and z are ⅓. The molar ratio of the transition metals (total of Ni, Co, and Mn) to Li is preferably 1 (that is, x+y+z=1). However, even if Li is a little excessive or a little short compared to the transition metals, a layered rock-salt crystal phase can be obtained, and a desired effect can be exerted. In this point, as represented by the composition formula, the molar ratio of the transition metals to Li is preferably 0.8 to 1.2 ($0.8 \leq x+y+z \leq 1.2$). The lower limit is more preferably no less than 0.9, and further preferably no less than 0.95, and the upper limit is more preferably no more than 1.1, and further preferably no more than 1.05. In the stoichiometric ratio as a layered rock-salt crystal phase, the molar ratio of O to Li (O/Li) is 2. However, even if oxygen is excessive, or the layered rock-salt crystal phase is partially deficient in oxygen, compared to the stoichiometric ratio as a layered rock-salt crystal phase, a crystalline structure of the layered rock-salt crystal phase itself is kept, and a desired effect can be exerted. In this point, for example, the molar ratio of O to Li (O/Li) is preferably 1.6 to 2.2. Or, in the composition formula, δ is preferably no more than 0.2. Specific examples of the composition inside the cathode active material 1 include $LiCoO_2$, and $LiNi_{1/3}Co_{1/3}Mn_{1/3}O_2$.

For example, the surface of the cathode active material 1 preferably has composition represented by $LiNi_\alpha Co_\beta Mn_\gamma O_{2\pm\delta}$ ($0 < \alpha \leq 0.5$, $0 \leq \beta \leq 1$, $0 < \gamma \leq 0.5$, $0.8 \leq \alpha+\beta+\gamma \leq 1.2$, $\beta < \gamma$). When the surface of the cathode active material 1 has such composition, a layered rock-salt type composite oxide is easy to be obtained while the concentration of cobalt is lowered. The lower limit of α is more preferably no less than 0.3, and further preferably no less than 0.4. The upper limit of β is more preferably no more than 0.3, and further preferably no more than 0.2. It is noted that β is smaller than γ. The lower limit of γ is more preferably no less than 0.3, and further preferably no less than 0.40. The molar ratio of the transition metals (total of Ni, Co, and Mn) to Li is preferably 1 (that is, α+β+γ=1). However, even if Li is a little excessive or a little short compared to the transition metals, a layered rock-salt crystal phase can be obtained, and a desired effect can be exerted. In this point, as represented by the composition formula, the molar ratio of the transition metals to Li is preferably 0.8 to 1.2 ($0.8 \leq \alpha+\beta+\gamma \leq 1.2$). The lower limit is more preferably no less than 0.9, and further preferably no less than 0.95, and the upper limit is more preferably no more than 1.1, and further preferably no more than 1.05. In the stoichiometric ratio as a layered rock-salt crystal phase, the molar ratio of O to Li (O/Li) is 2. However, a crystalline structure of the layered rock-salt crystal phase itself is kept, and a desired effect can be exerted even if oxygen is excessive, or the layered rock-salt crystal phase is partially deficient in oxygen, compared to the stoichiometric ratio as a layered rock-salt crystal phase. In this point, for example, the molar ratio of O to Li (O/Li) is preferably 1.6 to 2.2. Or, in the composition formula, δ is preferably no more than 0.2. Specific examples of the composition of the surface of the cathode active material 1 include $LiNi_{0.4}Co_{0.2}Mn_{0.4}O_2$, and $LiNi_{0.5}Mn_{0.5}O_2$.

According to the findings of the inventors of the present application, in a layered rock-salt type cathode active material as described above, as the concentration of cobalt that is a component of a layered rock-salt crystal phase is low, the rate of increasing a c-axis length of the layered rock-salt crystal phase in charging lowers. This seems to be because repulsion between oxygen-oxygen is small. Therefore, it is believed that as the concentration of cobalt is lower, release of oxygen in charging is suppressed more. On the other hand, as described above, when the concentration of cobalt is low in a layered rock-salt type cathode active material, the capacity as active material may be low, and lithium ion conductivity may lower. In view of these circumstances, in order to suppress release of oxygen in charging as keeping a high capacity, it is effective to make the concentration of cobalt inside the cathode active material 1 higher than that of its surface as described above. In other words, preferably, the rate of increasing a c-axis length of the layered rock-salt crystal phase included inside the cathode active material 1 in charging is higher than that of its surface in charging. Specifically, the rate of increasing a c-axis length of the layered rock-salt crystal phase included inside the cathode active material 1 in charging is preferably no less than 1.012, and that of its surface in charging is preferably lower than 1.012.

The shape of the cathode active material 1 is not specifically limited, and is preferably in the form of a particle. In this case, the form may be either a primary particle, or a secondary particle of cohering primary particles. When the cathode active material 1 is in the form of a particle, too small a particle diameter thereof leads to too large a specific surface area, especially, enlargement of the total area to be coated with a coating layer 3 described later when the coating layer 3 is provided for the surface of the cathode active material 1, and further increase of the volume of the coating layer 3 in the cathode mixture, which is sometimes disadvantageous in view of the process cost, the material cost, and an energy density of a cathode. In contrast, too large a particle diameter thereof leads to slow ion diffusion in the particle, which easily makes the initial internal resistance high when the cathode active material 1 is used in an all solid-state battery. In view of this, when the cathode active material 1 is in the form of a particle, its mean particle diameter ($D_{50}$) is preferably 1 μm to 15 μm. The mean particle diameter ($D_{50}$) represents a median diameter (50% mean volume particle diameter) derived from particle size distribution measured resulting from a particle counter based on a laser scattering and diffraction method. When the cathode active material 1 is in the form of a particle, its BET specific surface area is preferably 0.2 m$^2$/g to 2.0 m$^2$/g.

The content of the cathode active material 1 in the cathode mixture 10 is not specifically limited, and may be properly determined according to the performance of the battery to be aimed. For example, the content of the cathode active material 1 is preferably 30 mass % to 90 mass % if the whole of the cathode mixture 10 (whole of the solid content) is 100 mass %. The lower limit is more preferably no less than 50 mass %, and the upper limit is more preferably no more than 85 mass %.

1.2. Sulfide Solid Electrolyte 2

Any sulfide that is used as a solid electrolyte for an all solid-state battery can be employed for the sulfide solid electrolyte 2. Examples thereof include $Li_2S$—$P_2S_5$, $Li_2S$—$SiS_2$, $LiI$—$Li_2S$—$SiS_2$, $LiI$—$Li_2S$—$P_2S_5$, $LiI$—$LiBr$—$Li_2S$—$P_2S_5$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, and $Li_2S$—$P_2S_5$—$GeS_2$. Among them, specifically, a sulfide solid electrolyte containing $Li_2S$—$P_2S_5$ is more preferable. One may be individually used, or two or more may be mixed to be used as the sulfide solid electrolyte 2. The shape of the sulfide solid electrolyte 2 is not specifically limited. For example, the sulfide solid electrolyte 2 may be in the form of a particle.

The content of the sulfide solid electrolyte 2 in the cathode mixture 10 is not specifically restricted, and may be properly determined according to the performance of the battery to be aimed. For example, the content of the sulfide solid electrolyte 2 is preferably 5 mass % to 65 mass % if the whole of the cathode mixture 10 (whole of the solid content) is 100 mass %. The lower limit is more preferably no less than 10 mass %, and the upper limit is more preferably no more than 45 mass %.

1.3. Coating Layer 3

Figure 3:
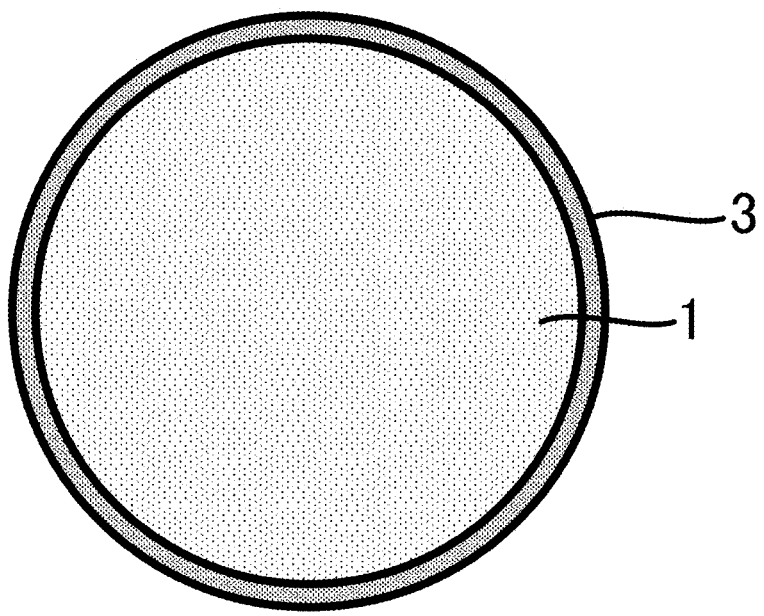
FIG. 3 is an explanatory schematic view of a coating layer 3.

Preferably, the cathode mixture 10 further includes the coating layer 3 with which the surface of the cathode active material 1 is coated. The coating layer 3 is a layer containing Li and Nb, and is especially preferably a layer formed of lithium niobate. When the cathode active material 1 is directly in contact with the sulfide solid electrolyte 2 in the cathode mixture 10, there is a case where the cathode active material 1 reacts with the sulfide solid electrolyte 2, to form a high resistance layer. In this point, the coating layer 3 can function as a protective layer for preventing the cathode active material 1 from being directly in contact with the sulfide solid electrolyte 2. From this viewpoint, all over the surface of the cathode active material 1 is preferably coated with the coating layer 3 as shown in FIG. 3. The thickness of the coating layer 3 is not specifically limited, and for example, may be 5 nm to 50 nm.

1.4. Other Constituents

The cathode mixture 10 may contain other constituents in addition to the cathode active material 1, the sulfide solid electrolyte 2, and the coating layer 3 as far as the problem can be solved.

The cathode mixture 10 preferably contains a conductive additive. Any known one as a conductive additive employed for an all solid-state battery can be employed. Examples thereof include carbon materials such as acetylene black (AB), Ketjenblack (KB), vapor grown carbon fiber (VGCF), carbon nanotubes (CNT), carbon nanofibers (CNF), and graphite; and metallic materials such as nickel, aluminum, and stainless steel. Especially, a carbon material is preferable. One may be used individually, or two or more may be mixed to be used as the conductive additive. Any shape such as powder and fiber can be employed for the conductive additive. The content of the conductive additive in the cathode mixture 10 is not specifically restricted, and may be properly determined according to the performance of the battery to be aimed. For example, the content of the conductive additive is preferably 0.5 mass % to 20 mass % if the whole of the cathode mixture 10 is 100 mass %. The lower limit is more preferably no less than 1 mass %, and the upper limit is more preferably no more than 10 mass %.

The cathode mixture 10 preferably contains a binder. Any known one as a binder employed for an all solid-state battery can be employed. For example, at least one selected from styrene-butadiene rubber (SBR), carboxymethyl cellulose (CMC), acrylonitrile-butadiene rubber (ABR), butadiene rubber (BR), polyvinylidene fluoride (PVDF), polytetrafluoroethylene (PTFE), etc. can be used. The content of the binder in the cathode mixture 10 is not specifically limited, and may be properly determined according to the performance of the battery to be aimed. For example, the content of the binder is preferably 1 mass % to 30 mass % if the whole of the cathode mixture 10 is 100 mass %. The lower limit is more preferably no less than 2 mass %, and the upper limit is more preferably no more than 15 mass %.

The cathode mixture 10 may contain (a) cathode active material(s) other than the cathode active material 1 as far as the problem can be solved. Examples thereof include a spinel type cathode active material, and an olivine type cathode active material.

The cathode mixture 10 may contain (a) solid electrolyte(s) other than the sulfide solid electrolyte 2 as far as the problem can be solved. Examples thereof include oxide solid electrolytes such as lithium lanthanum zirconate, LiPON, $Li_{1+x}Al_xGe_{2-x}(PO_4)_3$, Li—SiO-based glass, and Li—Al—S—O-based glass.

As described above, in the cathode mixture 10 of this disclosure, the concentration of cobalt inside the cathode active material 1 that consists of the composite oxide containing Li, Ni, Co, and Mn, and that has a layered rock-salt crystal phase is increased to secure a high capacity, and at the same time the concentration of cobalt of its surface is lowered, which makes it possible to suppress release of oxygen in charging. That is, when the cathode mixture 10 of this disclosure is used in a cathode 100 of an all solid-state battery 1000 described later, oxidation of the sulfide solid electrolyte due to release of oxygen from the cathode active material can be suppressed, and increase of the internal resistance of the all solid-state battery 1000 can be suppressed.

2. Cathode 100 for all Solid-State Battery

Figure 4:
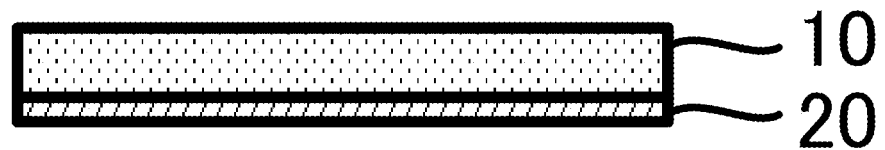
FIG. 4 is an explanatory schematic view of a cathode 100.

The cathode 100 shown in FIG. 4 is a cathode used for an all solid-state battery, and includes the cathode mixture 10, and a cathode current collector 20.

2.1. Cathode Mixture 10

Materials constituting the cathode mixture 10 are as described above. In the cathode 100 shown in FIG. 4, the cathode mixture 10 is provided for a surface of the cathode current collector 20 in the form of a layer. In this case, for example, the thickness of a layer consisting of the cathode mixture 10 is preferably 1 μm to 1 mm.

2.2. Cathode Current Collector 20

The cathode current collector 20 may have conductivity, and for example, may be constituted of metal foil, a metal mesh, etc. Especially, metal foil is preferable. Examples of metals that may constitute the cathode current collector 20 include Ni, Cr, Au, Pt, Al, Fe, Ti, Zn, and stainless steel. The cathode current collector 20 may have some coating layer over its surface. The thickness of the cathode current collector 20 is not specifically limited, and for example, is preferably 0.1 μm to 1 mm, and is more preferably 1 μm to 100 μm.

3. All Solid-State Battery 1000

Figure 5:
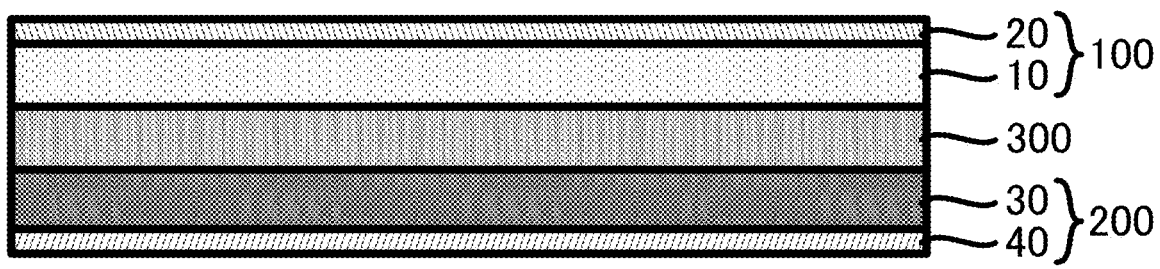
FIG. 5 is an explanatory schematic view of an all solid-state battery 1000.

The all solid-state battery 1000 shown in FIG. 5 includes the cathode 100, an anode 200, and a solid electrolyte layer 300.

3.1. Cathode 100

The structure of the cathode 100 is as described above. Detailed description thereof is omitted here.

3.2. Anode 200

The structure of the anode 200 in the all solid-state battery 1000 is obvious for the person skilled in the art. Hereinafter one example thereof will be described. The anode 200 usually includes an anode mixture layer 30 containing an anode active material, and containing, as optional constituents, a solid electrolyte, a binder, a conductive additive, and other additives (thickener etc.). The anode mixture layer 30 is preferably provided for a surface of an anode current collector 40.

The anode mixture layer 30 is a layer containing at least an anode active material, and may further contain a solid electrolyte, a binder, a conductive additive, etc. optionally, in addition to the anode active material. A known active material may be used as the anode active material. Among known active materials, one whose potential at which a predetermined ion is stored/released (charge/discharge potential) is baser than the cathode active material 1 can be used as the anode active material. For example, when a lithium ion battery is configured, Si or a Si alloy; a carbon material such as graphite and hard carbon; any oxide such as lithium titanate; a lithium metal or a lithium alloy; or the like can be used as the anode active material. The solid electrolyte, the binder, and the conductive additive may be properly selected among the examples for ones used in the cathode mixture 10, to be used. The contents of the constituents in the anode mixture layer 30 may be the same as conventional ones. The shape of the anode mixture layer 30 may be the same as a conventional one as well. Specifically, the anode mixture layer 30 in the form of a sheet is preferable from the viewpoint that the all solid-state battery 1000 can be easily configured. In this case, for example, the thickness of the anode mixture layer 30 is preferably 0.1 μm to 1 mm, and more preferably 1 μm to 100 μm. The thickness of the anode mixture layer 30 is preferably determined as such that the capacity of the anode 200 is larger than that of the cathode 100.

The anode current collector 40 may be constituted of metal foil, a metal mesh, etc. Especially, metal foil is preferable. Examples of metals that may constitute the anode current collector 40 include Cu, Ni, Fe, Ti, Co, Zn, and stainless steel. The anode current collector 40 may have some coating layer over its surface. The thickness of the anode current collector 40 is not specifically limited, and for example, is preferably 0.1 μm to 1 mm, and is more preferably 1 μm to 100 μm.

The anode 200 having the above described structure can be easily produced via a process such as: kneading the anode active material, and the solid electrolyte, binder, and conductive additive which are to be optionally contained, in solvent, to obtain paste or slurry containing an anode mixture, and thereafter applying the paste or slurry to the surface of the anode current collector, to be dried. The anode 200 can be produced via not only such a wet process, but also a dry process.

3.3. Solid Electrolyte Layer 300

The constitution of the solid electrolyte layer 300 in the all solid-state battery 1000 is obvious for the person skilled in the art. Hereinafter one example thereof will be described. The solid electrolyte layer 300 contains a sold electrolyte, and optionally a binder. For example, a sulfide solid electrolyte as described above is preferably employed for the solid electrolyte. For example, an inorganic solid electrolyte other than a sulfide solid electrolyte may be contained in addition to a sulfide solid electrolyte as far as a desired effect can be exerted. The same one as a binder as described above can be properly selected to be used. The contents of the constituents in the solid electrolyte layer 300 may be the same as conventional ones. The shape of the solid electrolyte layer 300 may be the same as a conventional one as well. Specifically, the solid electrolyte layer 300 in the form of a sheet is preferable. For example, the solid electrolyte layer 300 in the form of a sheet can be easily produced via a process such as: kneading the solid electrolyte, and optionally the binder in solvent, to obtain a slurry electrolyte composition, and thereafter applying this electrolyte composition to a surface of a base material or to (a) surface(s) of the cathode mixture layer and/or anode mixture layer, to be dried; and press-molding the solid electrolyte in a dry process. In this case, for example, the thickness of the solid electrolyte layer 300 is preferably 0.1 μm to 300 μm, and more preferably 0.1 μm to 100 μm.

3.4. Other Members

Needless to say, the all solid-state battery 1000 may include necessary terminals, a battery case, etc. in addition to the cathode 100, the anode 200, and the solid electrolyte layer 300. These members are publicly known, and detailed description thereof is omitted here.

4. Method for Producing Cathode Mixture 10

Figure 6:
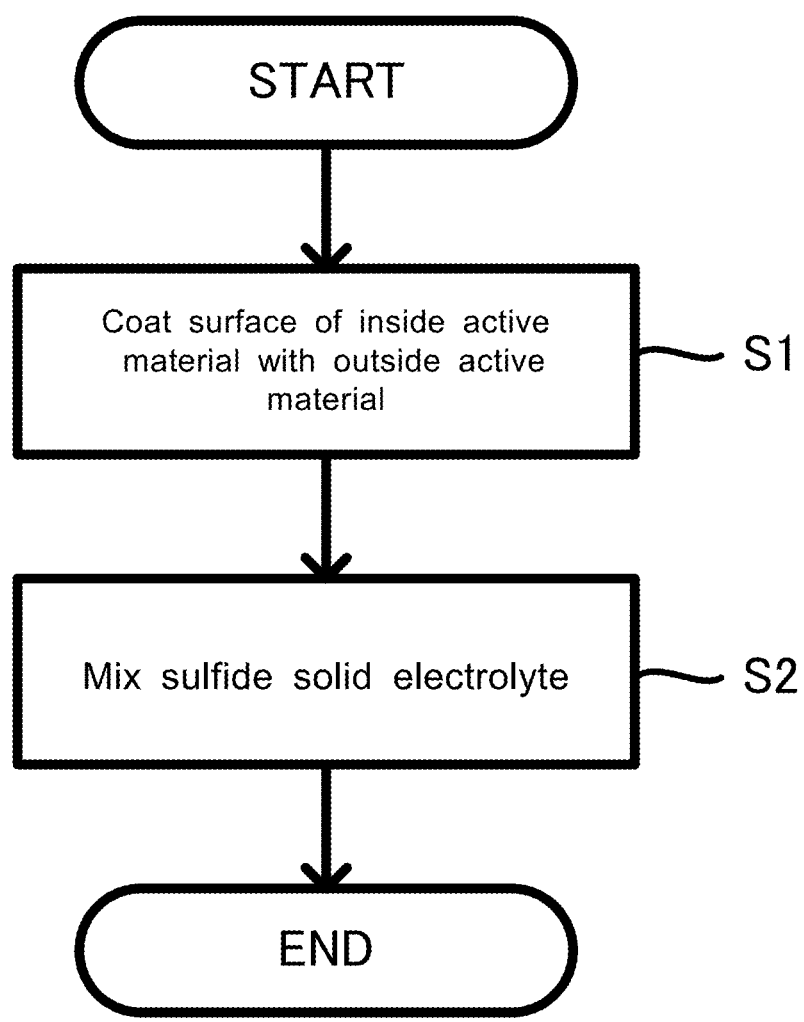
FIG. 6 is an explanatory flowchart of a method for producing the cathode mixture 10.

For example, the cathode mixture 10 can be produced as the flow shown in FIG. 6. That is, a method S10 for producing the cathode mixture 10 includes: a coating step S1 of coating a surface of an inside active material 1*a* with an outside active material 1*b*, to obtain the cathode active material 1; and a mixing step S2 of mixing the cathode active material 1 and the sulfide solid electrolyte 2, to obtain the cathode mixture 10. Here, the cathode active material 1 consists of a composite oxide containing Li, Ni, Co, and Mn. The cathode active material 1 has a layered rock-salt crystal phase. It is important in the producing method S10 that the concentration of cobalt in the inside active material 1a is higher than that in the outside active material 1b.

4.1. Coating Step S1

In the coating step S1, the surface of the inside active material 1a is coated with the outside active material 1b, to obtain the cathode active material 1. Both the inside active material 1a and outside active material 1b preferably consist of a composite oxide having a layered rock-salt crystal phase.

The composite oxide constituting the inside active material 1a preferably consists of a composite oxide having the same composition as the inside of the cathode active material 1. That is, the inside active material 1a preferably has composition represented by $LiNi_\alpha Co_\beta Mn_\gamma O_{2\pm\delta}$ ($0 \leq x \leq 0.5$, $0 < y \leq 1$, $0 \leq z \leq 0.5$, $0.8 \leq x+y+z \leq 1.2$). The composite oxide constituting the outside active material 1b preferably consists of a composite oxide having the same composition as the surface of the cathode active material 1. That is, the outside active material 1b preferably has composition represented by $LiNi_\alpha Co_\beta Mn_\gamma O_{2\pm\delta}$ ($0 < \alpha \leq 0.5$, $0 \leq \beta \leq 1$, $0 < \gamma \leq 0.5$, $0.8 \leq \alpha+\beta+\gamma \leq 1.2$, $\beta < y$). Preferred ranges of x, y, z, $\alpha$, $\beta$, $\gamma$, and $\delta$ in the composition formulae are as described above, and detailed description thereof is omitted here.

The inside active material 1a can be easily obtained by a method known as a method for obtaining a layered rock-salt type lithium composite oxide. The inside active material 1a can be easily obtained by, for example, mixing every raw material (a Li compound, a Ni compound, a Co compound, and a Mn compound) so that the materials have the composition ratio as described above, and calcining the mixed materials in a proper atmosphere such as an atmospheric atmosphere at a temperature of no less than a temperature at which a layered rock-salt crystal phase deposits. Alternatively, commercially available one may be used as the inside active material 1a. The inside active material 1a is preferably in the form of a particle.

A method for coating the surface of the inside active material 1a with the outside active material 1b is not specifically limited. For example, the surface of the inside active material 1a can be coated with the outside active material 1b by, for example, coating the surface of the inside active material 1a with raw materials of the outside active material 1b (a Li compound, a Ni compound, a Co compound, and a Mn compound. Preferably acetate, a nitrate, or a sulfate; a hydroxide; or the like), and calcining the resultant in a proper atmosphere such as an atmospheric atmosphere at a temperature of no less than a temperature at which a layered rock-salt crystal phase deposits, to form the outside active material 1b over the surface of the inside active material 1a. When the surface of the inside active material 1a is coated with raw materials of the outside active material 1b, solution that dissolves the raw materials of the outside active material 1b is preferably touched to the surface of the inside active material 1a. Specifically, the inside active material 1a is preferably immersed in solution that dissolves the raw materials of the outside active material 1b. In this case, preferably one may perform calcining as described above after solvent is removed by means of a rotary evaporator or the like.

When the surface of the inside active material 1a is coated with the outside active material 1b, the thickness of a layer of the outside active material 1b is not specifically limited. Preferably, a layer consisting of the outside active material 1b having a thickness of 10 nm to 200 nm is provided for the surface of the inside active material 1a. The thickness of the layer consisting of the outside active material 1b is more preferably 50 nm to 150 nm. No interface is necessary to exist between the inside active material 1a and the outside active material 1b. That is, the cathode active material 1 obtained in the coating step S1 does not necessarily have a core-shell structure including the inside active material 1a as a core and the outside active material 1b as a shell, and an intermediate region may be provided between the inside active material 1a and the outside active material 1b. According to the findings of the inventors of the present disclosure, when the inside active material 1a is immersed in solution that dissolves the raw materials of the outside active material 1b, thereafter to be calcined to coat the surface of the inside active material 1a with the outside active material 1b, there is a case where transition metals diffuse across the interface between the inside active material 1a and the outside active material 1b, to form an intermediate region having composition that is in the middle of the composition of the inside active material 1a and that of the outside active material 1b.

As described above, in a layered rock-salt type cathode active material, as the concentration of cobalt that is a component of a layered rock-salt crystal phase is low, the rate of increasing a c-axis length of the layered rock-salt crystal phase in charging lowers, and release of oxygen is suppressed. In contrast, as the concentration of cobalt is high, capacity as active material can be improved. In order to achieve both suppression of release of oxygen, and a high capacity, it is effective to make the concentration of cobalt inside the cathode active material 1 higher than that of its surface as described above. In view of this, in the producing method S10, preferably, the rate of increasing a c-axis length of the layered rock-salt crystal phase included in the inside active material 1a in charging is higher than that included in the outside active material 1b in charging.

As described above, coating the surface of the cathode active material 1 with the coating layer 3 makes it possible to suppress formation of a high resistance layer on the interface between the cathode active material 1 and the sulfide solid electrolyte 2. That is, in the coating step S1, preferably, the surface of the inside active material 1a is coated with the outside active material 1b to obtain the cathode active material 1, and the surface of the cathode active material 1 is further coated with the coating layer 3 containing Li and Nb (more preferably, a layer formed of lithium niobate). A way itself of coating the surface of the cathode active material 1 with the coating layer 3 is publicly known (JP 2017-059393 A, JP 2015-056307 A, etc.). For example, a precursor solution containing niobium and lithium is sprayed and atomized, to be dried and heat-treated, which makes it possible to coat the surface of the cathode active material 1 with the coating layer 3. Or, one may deposit the coating layer 3 on the surface of the cathode active material 1 by sputtering or the like.

4.2. Mixing Step S2

In the mixing step S2, the cathode active material 1 and the sulfide solid electrolyte 2 are mixed to obtain the cathode mixture 10. As described above, other constituents such as the conductive additive and the binder may be further mixed in addition to the cathode active material 1 and the sulfide solid electrolyte 2. A way of mixing the cathode active material 1 and the sulfide solid electrolyte 2 to obtain the cathode mixture 10 is not specifically limited. The mixing step S2 can be carried out using a known mixing means. Mixing in the mixing step S2 may be either wet mixing using solvent, or dry mixing not using solvent (mixing of granular materials each other). From the viewpoint that materials can be mixed more uniformly, wet mixing using solvent is preferable. Specifically, the cathode active material 1 and the sulfide solid electrolyte 2 are mixed together with solvent, to obtain paste or slurry containing the cathode mixture 10. A solvent used in this case is not specifically limited.

5. Method for Producing Cathode 100

For example, the cathode 100 of this disclosure can be produced as follows:

that is, a method for producing the cathode 100 includes: a step of producing the cathode mixture 10 by the producing method S10; and a step of layering the cathode mixture 10 onto the surface of the cathode current collector 20. Specifically, the cathode 100 can be easily produced via a process such as applying paste or slurry containing the cathode mixture 10 to the surface of the cathode current collector 20, to be dried. The cathode 100 can be produced by not only such a wet process, but also a dry process.

6. Method for Producing all Solid-State Battery 1000

For example, the all solid-state battery 1000 of this disclosure can be produced as follows: that is, a method for producing the all solid-state battery 1000 includes: a step of producing the cathode 100 by the producing method described above; and a step of layering the cathode 100, the solid electrolyte layer 300, and the anode 200. The all solid-state battery 1000 can be produced by, for example, layering the cathode 100, the solid electrolyte layer 300, and the anode 200 as described above, to obtain a laminate, and upon attaching proper terminals etc., sealing up the laminate in a battery case.

Examples

In the following Examples, "NCM111" means layered rock-salt type $LiNi_{1/3}Co_{1/3}Mn_{1/3}O_2$, "NCM424" means layered rock-salt type $LiNi_{0.4}Co_{0.2}Mn_{0.4}O_2$, and "NCM505" means layered rock-salt type $LiNi_{0.5}Mn_{0.5}O_2$.

1. Making Inside Active Material 1.1. Making Precursor

In a reactor, pure water was put, and nitrogen bubbling was performed to obtain an inert atmosphere. Into this reactor, 500 mL of a mixed aqueous solution of nickel sulfate, cobalt sulfate, and manganese sulfate was slowly dropped. At the same time, a 28% ammonia solution and a 10 mol/L sodium hydroxide solution were dropped together, to keep pH in the reactor a proper value (basicity). In the reactor, stirring was continued to be performed strongly so that pH was even all over. At this time, since transition-metal ions contained in the dropped mixed aqueous solution immediately deposited as a hydroxide, the solution in the reactor gradually became cloudy. The deposit generated in the reaction solution was cleaned and dried, to obtain a precursor of an inside active material. The concentrations of nickel sulfate, cobalt sulfate, and manganese sulfate in the mixed aqueous solution were changed to obtain precursors having various compositions. Specifically, when NCM111 was made, each of the concentrations of nickel sulfate, cobalt sulfate, and manganese sulfate in the mixed aqueous solution was 0.5 mol/L; when NCM424 was made, each of the concentrations of nickel sulfate and manganese sulfate was 0.6 mol/L, and that of cobalt sulfate was 0.3 mol/L; and when NCM505 was made, each of the concentrations of nickel sulfate and manganese sulfate was 0.7 mol/L, and that of cobalt sulfate was 0 mol/L.

1.2. Calcining

Powder of the obtained precursor and powder of $Li_2CO_3$ were mixed, and heat-treated in an air atmosphere at 700 to 1000° C., to obtain inside active material. The numbers of moles of Ni, Co, and Mn contained in the precursor and that of Li included in $Li_2CO_3$ were adjusted to have a proper quantity ratio as a layered rock-salt type composite oxide.

2. Coating with Outside Active Material 2.1. Making Precursor

Into a vessel, 700 mL of ethanol at an ambient temperature was put, and nickel acetate, cobalt acetate, and manganese acetate were added thereto while ethanol was stirred, to be dissolved, so that when an outside active material was to be NCM505, 0.026 mol of Ni and 0.026 mol of Mn were contained in the solution, and when the outside active material was to be NCM424, 0.021 mol of Ni, 0.021 mol of Mn, and 0.010 mol of Co were contained in the solution. Further, 0.32 mol (the number of moles on the basis of the transition metals) of powder of the inside active material was added thereto, to be stirred again to obtain slurry. The obtained slurry was moved into a rotary evaporator, and was subjected to evaporation to dryness under a reduced pressure while being stirred as the temperature was kept 50° C., to coat the surface of the inside active material with a precursor of the outside active material.

2.2. Calcining

After powder obtained above was ground by means of a mortar, the grounded powder was heated at 480° C. in an air atmosphere for 3 hours. Thereafter, the resultant was mixed with lithium hydroxide, and calcined at 850° C. in an air atmosphere for 2 hours, to coat the surface of the inside active material with the outside active material, to obtain a cathode active material. The number of moles of lithium hydroxide was equal to that of the transition metals contained in the precursor of the outside active material.

3. Coating with Coating Layer (Layer of Lithium Niobate)

The surface of the obtained cathode active material was sputtered with lithium niobate ($LiNbO_3$) by a barrel sputtering method, to be coated. Here, the powder of the active material was stirred in a reactor during sputtering so that the surface of the cathode active material was uniformly coated with lithium niobate.

4. Making Cathode Mixture

In heptane, the cathode active material, a sulfide solid electrolyte ($Li_2S$—$P_2S_5$-based glass ceramic), and a conductive additive (VGCF manufactured by Showa Denko K.K.) were put and fully mixed, to be pasty. The obtained paste was dripped onto a laboratory dish, to be dried to obtain powder of a cathode mixture.

5. Making all Solid-State Battery 5.1. Making Anode Mixture

In heptane, an anode active material (graphite powder), and a sulfide solid electrolyte (same as the above) were put and fully mixed, to be pasty. The obtained paste was dripped onto a laboratory dish, to be dried to obtain powder of an anode mixture.

5.2. Making Battery

In a ceramic mold of 1 $cm^2$, 75 mg of a sulfide solid electrolyte (same as the above) was put and pressed at 1 ton, to make a solid electrolyte layer. On the top side thereof, 20 mg of the powder of the cathode mixture was put and pressed at 1 ton, to form a cathode on the top side of the solid electrolyte layer. On the bottom side of the solid electrolyte layer, 25 mg of the powder of the anode mixture was put and pressed at 4 tons, to form an anode on the bottom side of the solid electrolyte layer. An all solid-state battery for evaluation was obtained by the procedures described above.

6. Evaluation Conditions 6.1. Measurement of Rate of Increasing c-axis Length

Powder of NCM111, powder of NCM424, and powder of NCM505 were made conforming to the procedures for making the inside active material, and the ratios of increasing c-axis lengths in charging were measured by the following procedures:

(1) the powder was used as a cathode active material, to make a half cell (a coin cell of an electrolyte solution system);

(2) as to this half cell, XRD patterns of the cathode active material (diffraction patterns derived from a layered rock-salt crystal phase) were obtained while the SOC (the amount of extracting Li ions from the cathode active material) was changed. It was noted that XRD patterns in the range of 0 mAh/g to 280 mAh/g in charge capacity were obtained;

(3) curve fitting (full pattern matching the obtained XRD patterns) was done on the obtained XRD patterns, to obtain a c-axis length of the layered rock-salt crystal phase per amount of extracting Li; and (4) (the maximum value of a c-axis length)/(a c-axis length in uncharging) was calculated to identify "the rate of increasing a c-axis length".

6.2. Charge/Discharge Testing

The made all solid-state battery was subjected to charge/discharge testing under the following conditions:
(Conditions)
system: CCCV charge/discharge testing
voltage range: 3.0 V to 4.3 V
rate: CC charge/discharge 0.2 C, CV charge/discharge 0.01 C 6.3. Resistance Evaluation Testing The made all solid-state battery was subjected to resistance evaluation testing under the following conditions:
(Conditions)
system: CC discharging from a predetermined voltage for 10 sec, measuring a voltage drop $\Delta V$, and calculating a resistance R ($=\Delta V/I$) from the ratio to a current value I
predetermined voltage: 3.8 V
rate: 7 C 6.4. Aging Testing The made all solid-state battery was subjected to aging testing under the following conditions:
system: sustain testing at a high voltage (trickle charging)
sustain conditions: at 60° C. at 4.5 V for 200 hours 7. Evaluation Results 7.1. Rate of Increasing c-axis Length The following Table 1 and FIG. 7 show the relations between the amount of extracting Li of layered rock-salt type $LiNi_xCo_{1-2x}Mn_xO_2$ and a c-axis length of a layered rock-salt crystal phase.

TABLE 1

|  | Ni [mol %] | Co [mol %] | Mn [mol %] | C-axis length in uncharging [Å] | C-axis length in charging (max.) [Å] | Rate of increasing c-axis length [—] |
|---|---|---|---|---|---|---|
| NCM111 | 33 | 33 | 33 | 14.1990 | 14.4342 | 1.017 |
| NCM424 | 40 | 20 | 40 | 14.3060 | 14.4710 | 1.012 |
| NCM505 | 50 | 0 | 50 | 14.4023 | 14.5082 | 1.007 |

Figure 7:
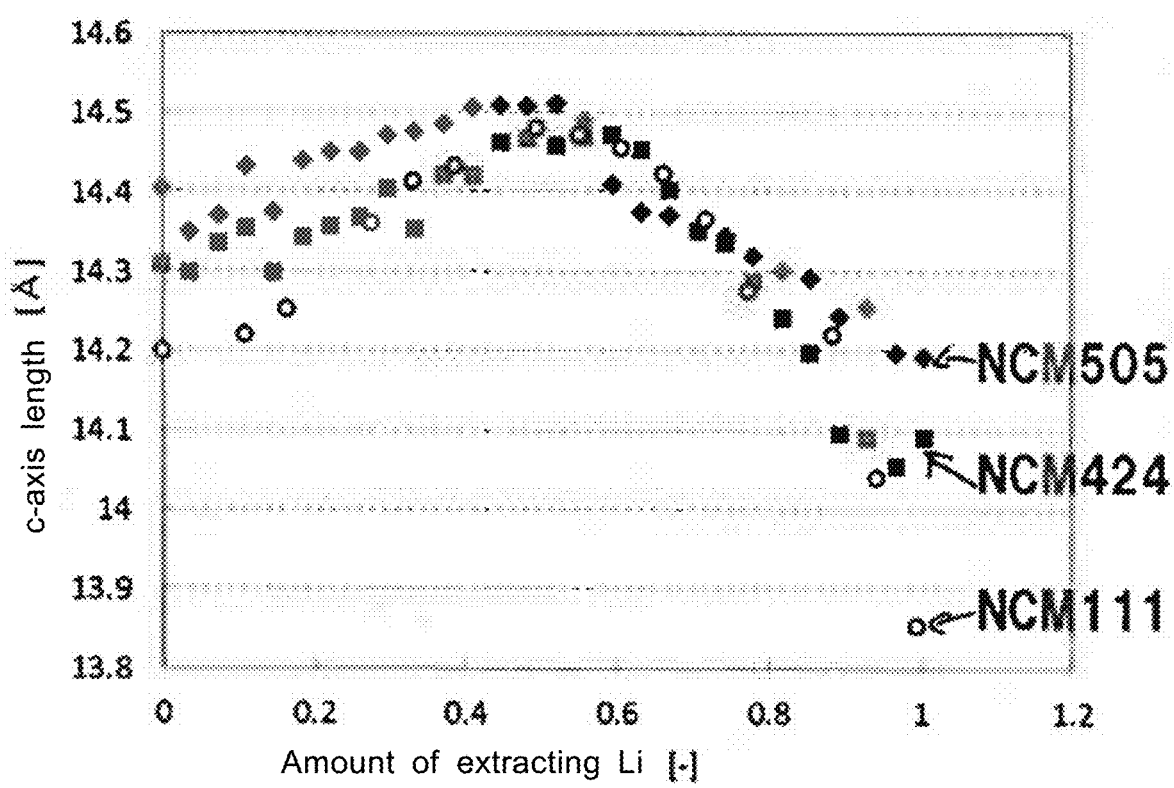
FIG. 7 shows relations between the amount of extracting Li and a c-axis length of a layered rock-salt crystal phase as to a layered rock-salt type composite oxide containing Li, Ni, Co, and Mn: NCM111 corresponds to layered rock-salt type $LiNi_{1/3}Co_{1/3}Mn_{1/3}O_2$, NCM424 corresponds to layered rock-salt type $LiNi_{0.4}Co_{0.2}Mn_{0.4}O_2$, and NCM505 corresponds to layered rock-salt type $LiNi_{0.5}Mn_{0.5}O_2$.

As is apparent from Table 1 and FIG. 7, as the concentration of cobalt was low, the rate of increasing a c-axis length in charging was low. This seems to be because repulsion between oxygen-oxygen was small. Thus, it is believed that as the concentration of cobalt was low, the amount of release of oxygen in charging was small. In more detail, it can be said that a low rate of changing a c-axis length meant small distortion of a layered rock-salt crystalline structure in a charged state, and its crystalline structure was stable, and therefore, release of oxygen is believed to have been suppressed.

7.2. Details on Examples and Comparative Examples

The following Table 2 shows "compositions of inside active material and outside active material which were used when cathode active material was made", "presence or not of coating layer", "rate of increasing c-axis length of layered rock-salt crystal phase of inside active material", and "rate of increasing c-axis length of layered rock-salt crystal phase of outside active material" as to the all solid-state battery according to each of Examples and Comparative Examples.

TABLE 2

|  | Composition of inside active material | Composition of outside active material | Coating layer | Rate of increasing c-axis length of inside active material | Rate of increasing c-axis length of outside active material |
|---|---|---|---|---|---|
| Ex. 1 | NCM111 | NCM505 | Present | 1.017 | 1.007 |
| Ex. 2 | NCM111 | NCM424 | Present | 1.017 | 1.012 |
| Comp. Ex. 1 | NCM111 | None | Present | 1.017 | 1.017 |
| Comp. Ex. 2 | NCM424 | None | Present | 1.012 | 1.012 |
| Comp. Ex. 3 | NCM505 | None | Present | 1.007 | 1.007 |
| Ex. 3 | NCM111 | NCM505 | None | 1.017 | 1.007 |
| Comp. Ex. 4 | NCM111 | None | None | 1.017 | 1.017 |

7.3. Crystal Phase Included in Cathode Active Material

Figure 8A:
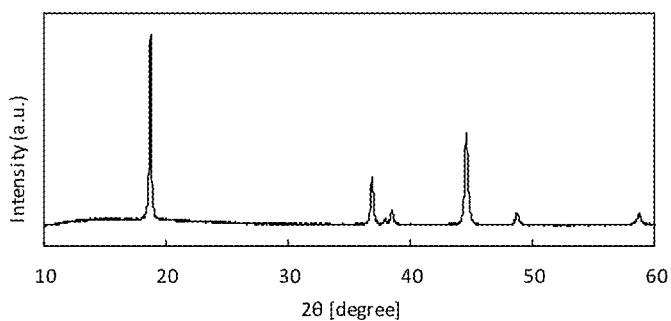
FIGS. 8A to 8E show X-ray diffraction patterns of cathode active materials.
Figure 8B:
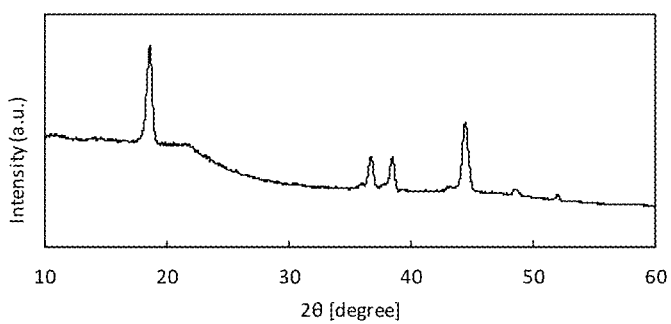
Figure 8C:
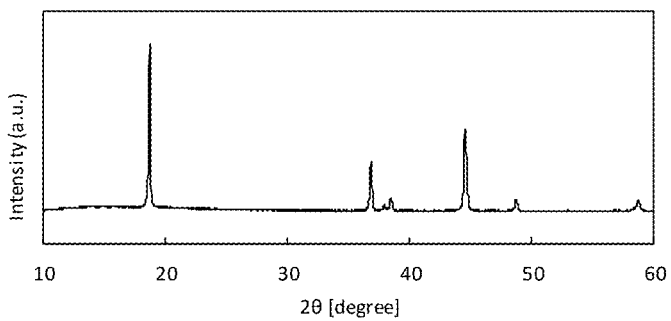
Figure 8D:
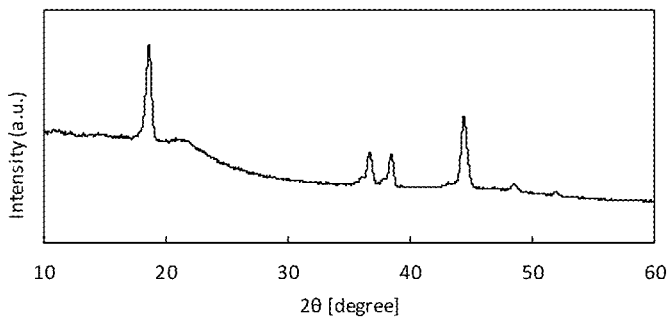
Figure 8E:
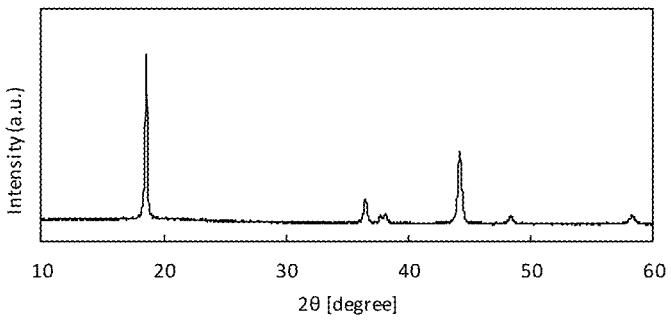

The cathode active materials used in Examples 1 and 2 and Comparative Examples 1 to 3 were subjected to measurement by means of X-ray diffraction before coated with the coating layers. The results are shown in FIGS. 8A to 8E. FIG. 8A corresponds to Example 1, FIG. 8B corresponds to Example 2, FIG. 8C corresponds to Comparative Example 1, FIG. 8D corresponds to Comparative Example 2, and FIG. 8E corresponds to Comparative Example 3. As is apparent from the results shown in FIGS. 8A to 8E, diffraction peaks only derived from a layered rock-salt crystal phase were confirmed, and no different phase was confirmed, as to all the cathode active materials. It is believed that the surfaces of the layered rock-salt type inside active materials were able to be coated with the layered rock-salt type outside active materials in both Examples 1 and 2.

7.4. SEM Observation of State of Surface of Cathode Active Material

Figure 9A:
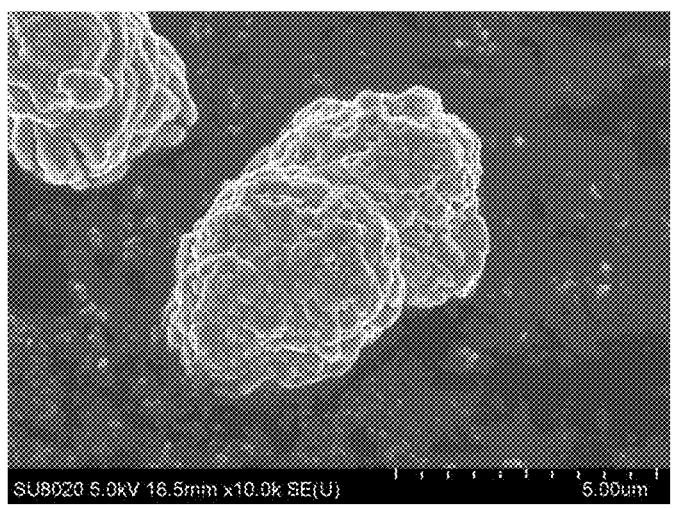
FIGS. 9A to 9C show SEM images of the cathode active materials.
Figure 9B:
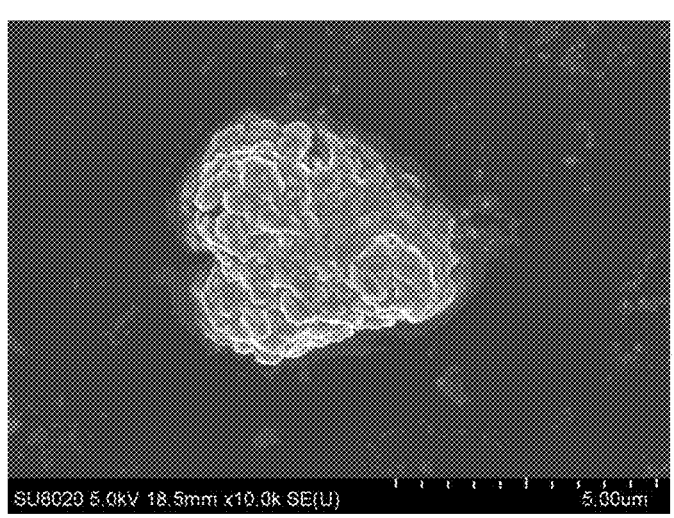
Figure 9C:
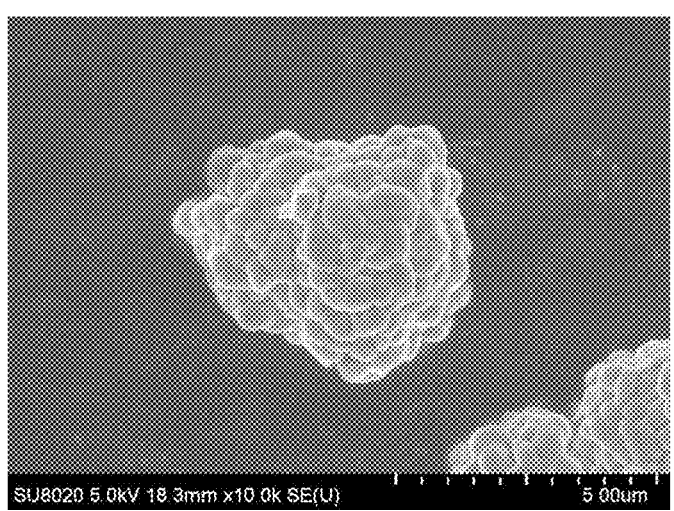

The states of the surfaces of the cathode active materials according to Examples 1 and 2 and Comparative Example 1 were observed by means of SEM. The results are shown in FIGS. 9A to 9C. FIG. 9A corresponds to Example 1, FIG. 9B corresponds to Example 2, and FIG. 9C corresponds to Comparative Example 1. As is apparent from the results shown in FIGS. 9A to 9C, coating the surface of the inside active material with the outside active material changed the state of the surface of the active material.

7.5. Evaluation Results of Battery Performance

The following Table 3 shows "capacity measured by charge/discharge testing", "initial resistance value measured by resistance evaluation testing", "resistance value after aging testing", and "rate of increasing resistance after aging testing compared with resistance before aging testing" as to the all solid-state battery of each of Examples and Comparative Examples. In Table 3, "capacity measured by charge/discharge testing" and "initial resistance value measured by resistance evaluation testing" are relatively represented on the basis of Comparative Example 1 (100).

TABLE 3

| | Capacity (relative value) | Initial resistance value (relative value) | Increased resistance value | Rate of increasing resistance value |
|---|---|---|---|---|
| Ex. 1 | 99 | 78 | 133 | 171% |
| Ex. 2 | 100 | 72 | 128 | 178% |
| Comp. Ex. 1 | 100 | 100 | 189 | 189% |
| Comp. Ex. 2 | 101 | 138 | 219 | 159% |
| Comp. Ex. 3 | 43 | 550 | 660 | 120% |
| Ex. 3 | 31 | >800 | — | — |
| Comp. Ex. 4 | 25 | >800 | — | — |

As is apparent from the results shown in Table 3, both the initial resistances, and the rates of increasing the resistance values in Examples 1 and 2 were lower than those of Comparative Example 1. It is believed that in Examples 1 and 2, having lowered the concentrations of cobalt of the surfaces of the cathode active materials more than those inside the cathode active materials made release of oxygen in charging suppressed, and made oxidation of the sulfide solid electrolytes suppressed.

In Examples 1 and 2, having increased the concentrations of cobalt inside the cathode active materials led to high capacities equivalent to that of Comparative Example 1.

In Comparative Examples 2 and 3, since the cathode active materials were formed of only composite oxides having low concentrations of cobalt, release of oxygen in charging was suppressed, and the rates of increasing the resistance values were lower than those of Examples 1 and 2 and Comparative Example 1. However, since in Comparative Examples 2 and 3, the initial resistance values were high first of all, there was no advantage over Comparative Example 1. Specifically, in Comparative Example 3, not only the initial resistance value was high, but also the capacity was lowered. The reason why the initial resistances were high in Comparative Examples 2 and 3 is believed to be because lithium ion conductivity in particles lowered accompanying lowering of the concentrations of cobalt.

Example 3 and Comparative Example 4 were examples where the surfaces of the cathode active materials were not coated with the coating layers (layers of lithium niobate). As is apparent from the comparison between Example 3 and Comparative Example 4, the effect of having lowered the concentration of cobalt of the surface of the cathode active material more than that inside the cathode active material was confirmed as well when the layer of lithium niobate was not included. Since there was no difference between Example 3 and Comparative Example 4 in theoretical capacity, it is believed that difference in capacity in this case was due to difference in initial resistance. That is, the resistance in Example 3 can be said to have been lower.

INDUSTRIAL APPLICABILITY

The all solid-state battery using the cathode mixture of this disclosure can be used in a wide range of power sources such as a small-sized power source for portable terminals and an onboard large-sized power source.

REFERENCE SIGNS LIST

1 cathode active material
2 sulfide solid electrolyte
3 coating layer
10 cathode mixture (cathode mixture layer)
20 cathode current collector
30 anode mixture layer
40 anode current collector
100 cathode
200 anode
300 solid electrolyte layer
1000 all solid-state battery

What is claimed is:

1. A cathode mixture for an all-solid-state battery, the cathode mixture comprising:
    a cathode active material; and
    a sulfide solid electrolyte,
    wherein
    the cathode active material consists of a composite oxide containing Li, Ni, Co, and Mn,
    the cathode active material has a layered rock-salt crystal phase,
    the cathode active material includes an inside active material and an outside material,
    the inside active material is coated with the outside active material,
    the inside active material has a composition represented by $LiNi_xCo_yMn_zO_{2\pm\delta}$, where x is $\frac{1}{3}$, y is $\frac{1}{3}$, z is $\frac{1}{3}$, and $\delta \leq 0.2$,
    the outside active material has a composition represented by $LiNi_\alpha Co_\beta Mn_\gamma O_{2\pm\delta}$, where $0 \leq \alpha \leq 0.5$, $0.2 \leq \beta < 1$, $0 < \gamma \leq 0.5$, $0.8 \leq \alpha+\beta+\gamma \leq 1.2$, $\beta < y$, and $\delta \leq 0.2$, and
    a concentration of cobalt in the inside active material is higher than a concentration of cobalt in the outside active material.

2. The cathode mixture according to claim 1, further comprising:
a coating layer with which the surface of the cathode active material is coated, the coating layer containing Li, and Nb.

3. A cathode for an all solid-state battery, the cathode comprising:
the cathode mixture according to claim 1; and
a cathode current collector.

4. An all solid-state battery comprising:
the cathode according to claim 3;
an anode; and
a solid electrolyte layer.

5. The cathode mixture according to claim 1, wherein the cathode active material consists of an inside active material and an outside active material.

6. The cathode mixture according to claim 1, wherein $0.3 \leq \alpha \leq 0.5$.

7. The cathode mixture according to claim 6, wherein $0.4 \leq \alpha \leq 0.5$.

8. The cathode mixture according to claim 1, wherein $0.3 \leq \gamma \leq 0.5$.

9. The cathode mixture according to claim 8, wherein $0.4 \leq \gamma \leq 0.5$.

10. The cathode mixture according to claim 1, wherein the cathode active material is formed by coating a surface of the inside active material with the outside active material.

11. The cathode mixture according to claim 1, wherein the cathode active material is in a form of a particle having:
(i) a mean particle diameter that is in a range of from 1 μm to 15 μm, and
(ii) a BET specific surface area that is in a range of from 0.2 m²/g to 2.0 m²/g.

12. The cathode mixture according to claim 1, wherein the cathode mixture consists of:
the cathode active material, which is optionally coated with a layer including Li and Nb on a surface of the cathode active material;
the sulfide solid electrolyte;
optionally at least one conductive additive, and
optionally at least one binder that is selected from the group consisting of styrene-butadiene rubber, carboxymethyl cellulose, acrylonitrile-butadiene rubber, butadiene rubber, polyvinylidene fluoride, and polytetrafluoroethylene.

13. A method for producing a cathode mixture for an all solid-state battery, the method comprising:
coating a surface of an inside active material having a composition represented by $LiNi_xCo_yMn_zO_{2\pm\delta}$, where x is ⅓, y is ⅓, z is ⅓, and $\delta \leq 0.2$, with an outside active material having a composition represented by $LiNi_\alpha Co_\beta Mn_\gamma O_{2\pm\delta}$, where $0<\alpha \leq 0.5$, $0.2 \leq \beta <1$, $0<\gamma \leq 0.5$, $0.8 \leq \alpha+\beta+\gamma \leq 1.2$, $\beta<y$, and $\delta \leq 0.2$, to obtain a cathode active material consisting of a composite oxide containing Li, Ni, Co, and Mn; and
mixing the cathode active material and a sulfide solid electrolyte to obtain a cathode mixture,
wherein
the cathode active material has a layered rock-salt crystal phase,
a concentration of cobalt in the inside active material is higher than a concentration of cobalt in the outside active material.

14. The method according to claim 13, wherein
a rate of increasing a c-axis length of a layered rock-salt crystal phase included in the inside active material in charging is higher than a rate of increasing a c-axis length of a layered rock-salt crystal phase included in the outside active material in charging.

15. The method according to claim 13, wherein
in said coating, the surface of the inside active material is coated with the outside active material, to obtain the cathode active material, and a surface of the cathode active material is further coated with a coating layer containing Li, and Nb.

16. A method for producing a cathode for an all solid-state battery, the method comprising:
producing a cathode mixture by the method according to claim 5; and
layering the cathode mixture onto a surface of a cathode current collector.

17. A method for producing an all solid-state battery, the method comprising:
producing a cathode by the method according to claim 16; and
layering the cathode, a solid electrolyte layer, and an anode.

18. A cathode mixture for an all-solid-state battery, the cathode mixture consisting of:
a cathode active material, the cathode active material consisting of a composite oxide containing Li, Ni, Co, and Mn, wherein the cathode active material is optionally coated with a layer of lithium niobate on a surface of the cathode active material;
a sulfide solid electrolyte selected from the group consisting of $Li_2S-P_2S_5$, $Li_2S-SiS_2$, $LiI-Li_2S-SiS_2$, $LiI-Si_2S-P_2S_5$, $LiI-LiBr-Li_2S-P_2S_5$, $LiI-Li_2S-P_2S_5$, $LiI-Li_2O-Li_2S-P_2S_5$, $LiI-Li_2S-P_2O_5$, $LiI-Li_3PO_4-P_2S_5$, and $Li_2S-P_2S_5-GeS_2$;
at least one binder selected from the group consisting of styrene-butadiene rubber, carboxymethyl cellulose, acrylonitrile-butadiene rubber, butadiene rubber, and polytetrafluoroethylene; and
optionally at least one conductive additive selected from the group consisting of acetylene black (AB), Ketjenblack (KB), vapor grown carbon fiber (VGCF), carbon nanotubes (CNT), carbon nanofibers (CNF), graphite, nickel, aluminum, and stainless steel; and
wherein
the cathode active material has a layered rock-salt crystal phase,
the cathode active material has an inside active material and an outside material,
the inside active material is coated with the outside active material,
the inside active material has a composition represented by $LiNi_xCo_yMn_zO_{2\pm\delta}$, where x is ⅓, y is ⅓, z is ⅓, and $\delta \leq 0.2$,
the outside active material has a composition represented by $LiNi_\alpha Co_\beta Mn_\gamma O_{2\pm\delta}$, where $0<\alpha \leq 0.5$, $0.2 \leq \beta <1$, $0<\gamma \leq 0.5$, $0.8 \leq \alpha+\beta+\gamma \leq 1.2$, $\beta<y$, and $\delta \leq 0.2$, and
a concentration of cobalt in the inside active material is higher than a concentration of cobalt in the outside active material.

19. The cathode mixture according to claim 18, wherein at least one binder is selected from the group consisting of styrene-butadiene rubber, carboxymethyl cellulose, acrylonitrile-butadiene rubber, and butadiene rubber.

* * * * *